(12) United States Patent
Almousa et al.

(10) Patent No.: US 12,276,379 B2
(45) Date of Patent: Apr. 15, 2025

(54) HOT OIL MEDIA FOR SULFUR EXPORT LINE AND SULFUR STORAGE TANK

(71) Applicant: SAUDI ARABIAN OIL COMPANY, Dhahran (SA)

(72) Inventors: Abdullah Almousa, Dammam (SA); Hussain Almomen, Udhailiyah (SA); Abdulrahman Al-Methn, Riyadh (SA); Mishar K. Paul, Calgary (CA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 727 days.

(21) Appl. No.: 17/546,778

(22) Filed: Dec. 9, 2021

(65) Prior Publication Data

US 2023/0184390 A1 Jun. 15, 2023

(51) Int. Cl.
*F17D 1/08* (2006.01)
*F16L 53/32* (2018.01)
*F28F 27/02* (2006.01)

(52) U.S. Cl.
CPC ............. *F17D 1/084* (2013.01); *F16L 53/32* (2018.01); *F28F 27/02* (2013.01); *F28F 2250/104* (2013.01)

(58) Field of Classification Search
CPC .. F17D 1/08; F17D 1/084; F16L 53/32; F28F 27/02; F28F 2250/104
See application file for complete search history.

(56) References Cited

U.S. PATENT DOCUMENTS

| | | | | |
|---|---|---|---|---|
| 4,155,654 A | * | 5/1979 | Kennepohl | E01C 7/267 366/144 |
| 7,501,111 B2 | | 3/2009 | Keller et al. | |
| 2014/0045129 A1 | | 2/2014 | Pickren et al. | |
| 2014/0363350 A1 | | 12/2014 | Hodson | |
| 2019/0224618 A1 | * | 7/2019 | Tanna | B01D 53/229 |

OTHER PUBLICATIONS

"Storage Tank Heating", Pirobloc, accessed Sep. 17, 2021, URL: <https://www.pirobloc.com/en/applications-and-sectors/storage-tank-heating/> (19 pages).

* cited by examiner

*Primary Examiner* — Harry E Arant
(74) *Attorney, Agent, or Firm* — Osha Bergman Watanabe & Burton LLP

(57) ABSTRACT

A system for heating one or more sulfur transport and storage systems including a hot oil distribution system, a first transport line fluidly connecting one or more reboilers to an inlet on a heating jacket on a sulfur transport system, a second transport line fluidly connecting an outlet of the heating jacket on the sulfur transport system to an inlet on a heating coil in a sulfur storage system, and a third transport line fluidly connecting an outlet on the heating coil in the sulfur storage system to a return header on the hot oil distribution system.

11 Claims, 4 Drawing Sheets

HOT OIL MEDIA FOR SULFUR EXPORT LINE AND SULFUR STORAGE TANK

BACKGROUND

A heating system is necessary for sulfur transport and storage systems to ensure sulfur materials stored in tanks remain in the liquid state. If the sulfur materials cool below a certain temperature, they will solidify, or partially solidify, and become difficult to transport in pipes.

Sulfur plants are generally equipped with means to generate steam for use throughout the plant. Currently, the sulfur product line is jacketed by low pressure (LP) steam and insulated to maintain the sulfur at the required temperature of about 280-305° F. in order to avoid solidification. The sulfur storage tank is also fitted with coils and insulated. The LP steam is fed to the coils to maintain the sulfur temperature in the tank at about 270-300° F. in order to avoid solidification within the tank. The LP steam produced for sulfur plants requires several steam traps to remove any condensed water and are often prone to erosion and corrosion from the water/steam in addition to sulfur solidifications.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, embodiments disclosed relate to a system for heating one or more sulfur transport and storage systems. The system includes a hot oil distribution system configured for feeding a first hot oil stream to one or more reboilers, a first transport line fluidly connecting the one or more reboilers to an inlet on a heating jacket on a first sulfur transport and storage system, the first transport line configured to transport a second hot oil stream from the one or more reboilers to the inlet on the heating jacket on the first sulfur transport and storage system, a second transport line fluidly connecting an outlet of the heating jacket on the first sulfur transport and storage system to an inlet on a heating coil in a second sulfur transport and storage system, the second transport line configured to transport a first cooled hot oil stream from the outlet of the heating jacket on the first sulfur transport and storage system to the inlet on the heating coil in the second sulfur transport and storage system, and a third transport line fluidly connecting an outlet on the heating coil in the second sulfur transport and storage system to a return header on the hot oil distribution system, the third transport line configured to transport a second cooled hot oil stream from the outlet of the heating coil in the second sulfur transport and storage system to a return header on the hot oil distribution system.

In one aspect, embodiments disclosed relate to a method for heating one or more sulfur transport and storage systems. The method includes feeding a first portion of a first hot oil stream from a hot oil distribution system to one or more reboilers and recovering a second hot oil stream, feeding a first portion of the second hot oil stream at a temperature from 285-295° F. from the one or more reboilers to through a first transport line to an inlet on a heating jacket on a first sulfur transport and storage system and heating a sulfur product in the first sulfur transport and storage system, recovering a first cooled hot oil stream from an outlet on the heating jacket on the first sulfur transport and storage system, feeding a first portion of the first cooled hot oil stream to an inlet on a heating coil in a second sulfur transport and storage system through a second transport line and heating a sulfur product in the second sulfur transport and storage system, recovering a second cooled hot oil stream from an outlet on the heating coil in the second sulfur transport and storage system, and feeding the second cooled hot oil stream through a third transport line to a return header on the hot oil distribution system.

Other aspects and advantages of the claimed subject matter will be apparent from the following description and the appended claims.

DETAILED DESCRIPTION

For the purpose of this description, a single reference number will be assigned to a feed line as well as a stream carried in that feed line. Same reference numbers refer to similar components. The person skilled in the art will readily understand that, while the invention is illustrated referring to one or more specific combinations of features and measures, many of those features and measures are functionally independent from other features and measures such that they can be equally or similarly applied independently in other embodiments or combinations.

One or more embodiments disclosed are related to systems and processes for maintaining sulfur in a liquid state without requiring a separate steam generation system. This may be accomplished by replacing the existing LP steam system of a sulfur transport and storage system with a hot oil heating system. Such hot oil heating system may heat the sulfur product line and the sulfur storage tank, provide the necessary heat to maintain the sulfur in a liquid state, enhance the unit reliability, and reduce maintenance on the stream traps.

The hot oil stream may be a closed loop circulation system with heat input from any suitable source, such as gas turbine exhaust. In one or more embodiments, the hot oil may be a process heat medium used to supply heat to other process reboilers or heat exchangers. In one or more embodiments, the reboiler may be associated with a triethylene glycol (TEG) regeneration units, amine acid gas handling (AGH), or acid gas enrichment (AGE) units. Such processes use a system for heating inert oils or intermediate process streams as the heating medium in the reboiler or other heat exchange apparatus.

The hot oil may be supplied to the AGH, TEG, AGE reboilers (together "reboilers") as heating media in a closed loop. These processes use the hot oil primarily as a reboiler heating medium, but the stream may also be used as process streams, diluent streams, other material balance purposes, or heating other process streams.

The hot oil may be supplied mainly from a hot oil circulation system distribution header upstream or downstream of the reboilers via a discharge pump and a branch line from the AGH, TEG, or AGE system to the sulfur transport and storage system. The hot oil temperature from 280-320° F. can be used as a heating media in the sulfur transport system. The temperature of the hot oil stream may be reduced in the sulfur transport system. After exiting the sulfur transport system, the hot oil temperature may be from 280-320° F. before being fed to the sulfur storage system. Such temperatures may be sufficient to avoid solidification and maintaining of the viscosity of the sulfur product. In such a fashion, the system may replace the typical low-pressure steam at 50 psig with the hot oil circulation system.

Figure 1:
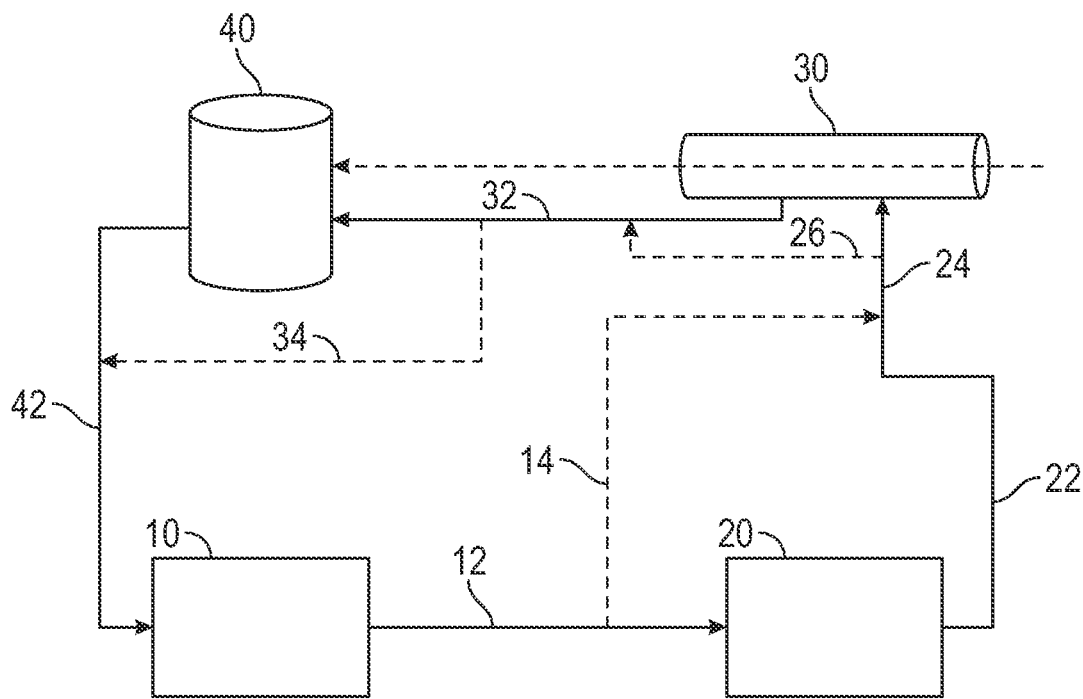
FIG. 1 is a simplified block flow diagram according to one or more embodiments disclosed.

Referring now to FIG. 1, a system for heating a sulfur transport, a sulfur storage, or a sulfur transport and storage system using hot oil according to one or more embodiments disclosed is illustrated. As illustrated, a hot oil distribution system 10 may contain a hot oil stream used as a heating medium in an AGH, TEG, or AGE system. The hot oil may be one or more of MARLOTHERM® N (available from the Chem Group, Evansville, IN), which is primarily alkylated benzenes, or THERMINOL® 55 (available from Eastman Chemical Company, Kingsport, TN) which is primarily benzene and mono-C10-13-alkylated benzenes.

The hot oil distribution system 10 may feed a first hot oil stream 12 to one or more AGH, TEG, or AGE reboiler 20. The first hot oil stream 12 may be at a temperature in the range of 450-480° F. A first transport line 22 may fluidly connect the one or more reboilers 20 to an inlet on a heating jacket 30 on a first sulfur transport and storage system and transport hot oil from the reboiler outlet to the heating jacket 30 on the first sulfur transport and storage system. The first sulfur transport and storage system may be a jacketed sulfur transport line and the temperature of the hot oil in the first transport line 22 may be from 280-320° F., such as from 285-315° F., or from 285-290° F. Such a temperature of the second hot oil stream in the first transport line 22 may be sufficient to keep the sulfur in the first sulfur transport and storage system from solidifying.

The hot oil stream in the heating jacket may cool slightly as the hot oil loses heat to the sulfur product in the first sulfur transport and handing unit. A cooled hot oil stream may be removed the heating jacket 30 via a second transport line 32 fluidly connecting an outlet of the heating jacket on the first sulfur transport and storage system to an inlet on a heating coil in a second sulfur transport and storage system 40. The temperature in the second transport line 32 may be in the range of 285-310° F. The second sulfur transport and storage system may be a sulfur storage tank, and the temperature of the hot oil in the second transport line 32 may be sufficient to keep the stored sulfur from solidifying.

The hot oil stream may be removed from the second sulfur transport and storage system as a second cooled hot oil stream from an outlet and transferred via a third transport line 42. The third transport line 42 may fluidly connect the outlet on the heating coil in the second sulfur transport and storage system 40 to a return header on the hot oil distribution system 10. The temperature of the hot oil stream in the third transport line 42 may be from 275-300° F.

In one or more embodiments, the temperature in the first transport line 22 may be insufficient to heat the volume of sulfur in the heating jacket 30 on a first sulfur transport and storage system and the second sulfur transport and storage system 40. In such embodiments, a make-up stream may be used. Such make-up stream may be a fourth transport line 14 fluidly connecting from the hot oil distribution system 10 to the first transport line 22 at a point upstream of the inlet on the heating jacket 30. The fourth transport line 14 may feed a hot oil makeup stream from the hot oil distribution system 10 to the first transport line 22, bypassing the one or more reboilers 20 and forming an intermediate hot oil stream 24. The hot oil make-up stream in the fourth transport line 14 may be at a temperature from 400-500° F., such as from 450-480° F., similar to the temperature in the first hot oil stream 12. Such a makeup stream may raise the temperature of the intermediate hot oil stream 24 to a temperature from 295-315° F. This temperature may be sufficient to keep the sulfur in the first sulfur transport and storage system from solidifying. In order to achieve the desired temperature, the volume ratio of hot oil in the fourth transport line 14 to the hot oil fed to the one or more reboilers 20 via first hot oil stream 12 may be in the from 1:10 to 10:1.

In one or more embodiments, a first bypass line 26 may be used to fluidly connect the first transport line 22 (or intermediate hot oil stream 24) upstream of the inlet on the heating jacket 30 on the first sulfur transport and storage system to the second transport line 32 downstream of the outlet on the heating jacket 30 on the first sulfur transport and storage system. This first bypass line 26 may be used to supply additional hot oil at a temperature in the range of 295-315° F. to the cooled hot oil stream in the second transport line 32. By mixing the hot oil in the first bypass line 26 with the cooled hot oil in the second transport line 32, the temperature of the hot oil in the second transport line 32 may be increased in order to supply additional heating to the heating coil in the second sulfur transport and storage system 40 by bringing the temperature of hot oil stream in the second transport line 32 to above 285° F. In order to achieve the desired temperature in the second transport line 32, the volume ratio of hot oil in the first bypass line 26 to the hot oil fed to the heating jacket 30 via the first transport line 22 may be in the from 1:10 to 10:1.

In one or more embodiments, a second bypass line 34 may be used to fluidly connect the second transport line 32 upstream of the inlet on the heating coil in the second sulfur transport and storage system 40 to the third transport line 42 downstream of the outlet on the heating coil in the second sulfur transport and storage system 40. The second bypass line 34 may be used to divert a volume of hot oil from the heating coil back to the hot oil distribution system 10. This bypass may be used during periods where less heating duty is required in the second sulfur transport and storage system 40. The volume ratio of hot oil in the second bypass line 34 to the hot oil fed to the second sulfur transport and storage system 40 via the second transport line 32 may be in the from 1:10 to 10:1.

Figure 2:
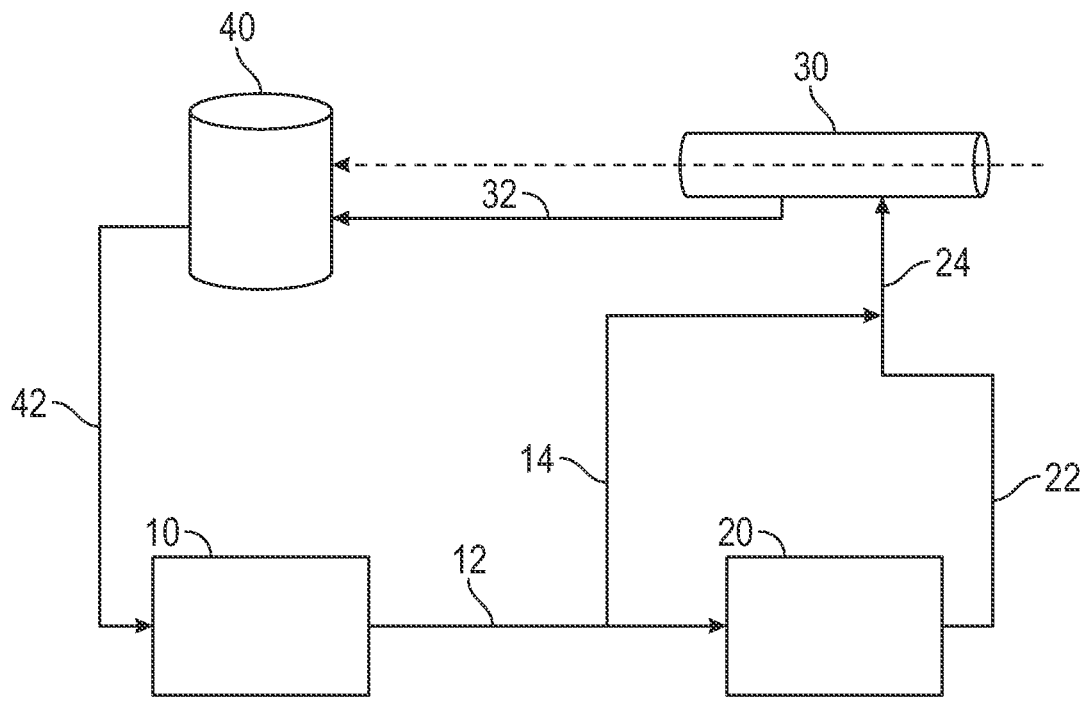
FIG. 2 is a simplified block flow diagram according to one or more embodiments disclosed.
Figure 3:
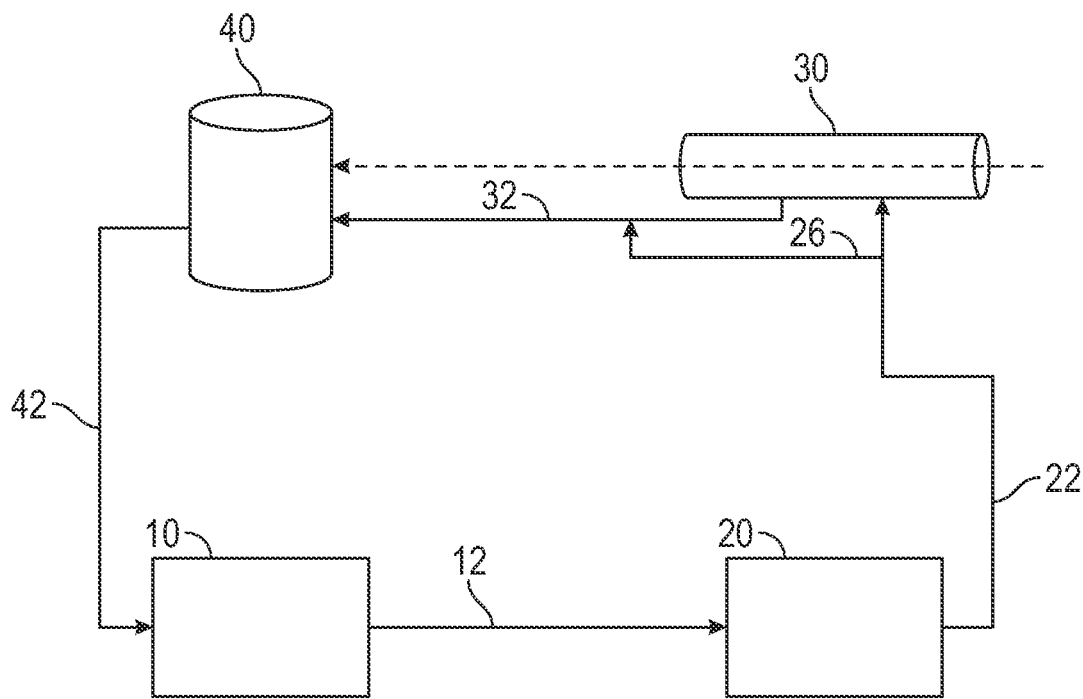
FIG. 3 is a simplified block flow diagram according to one or more embodiments disclosed.
Figure 4:
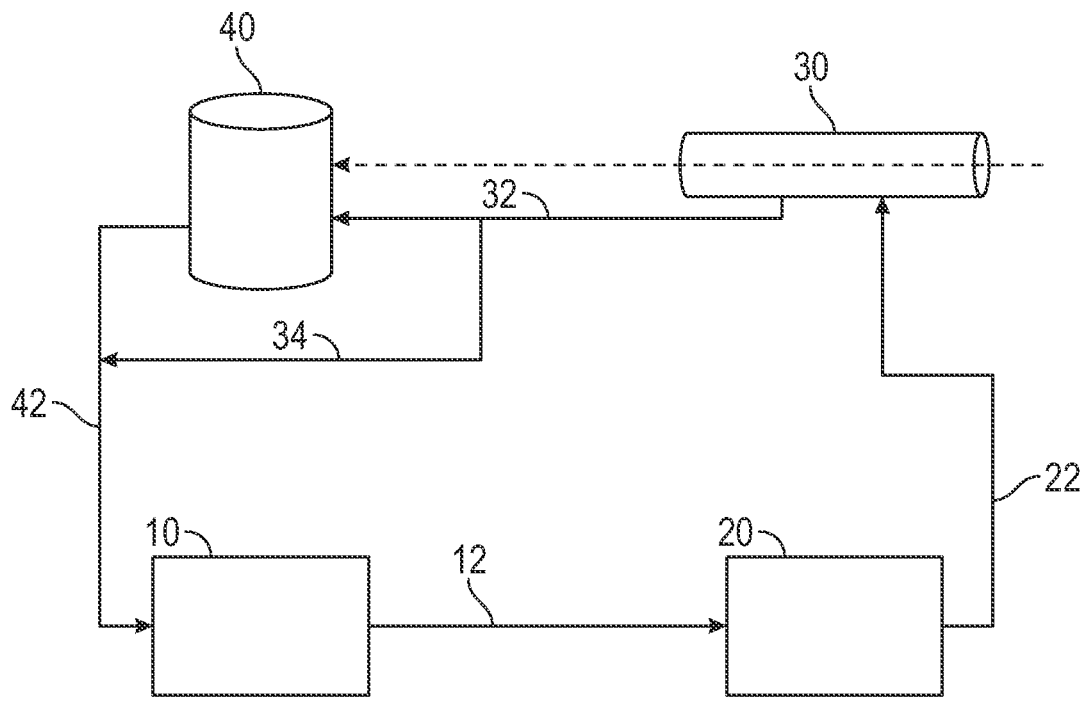
FIG. 4 is a simplified block flow diagram according to one or more embodiments disclosed.
Figure 5:
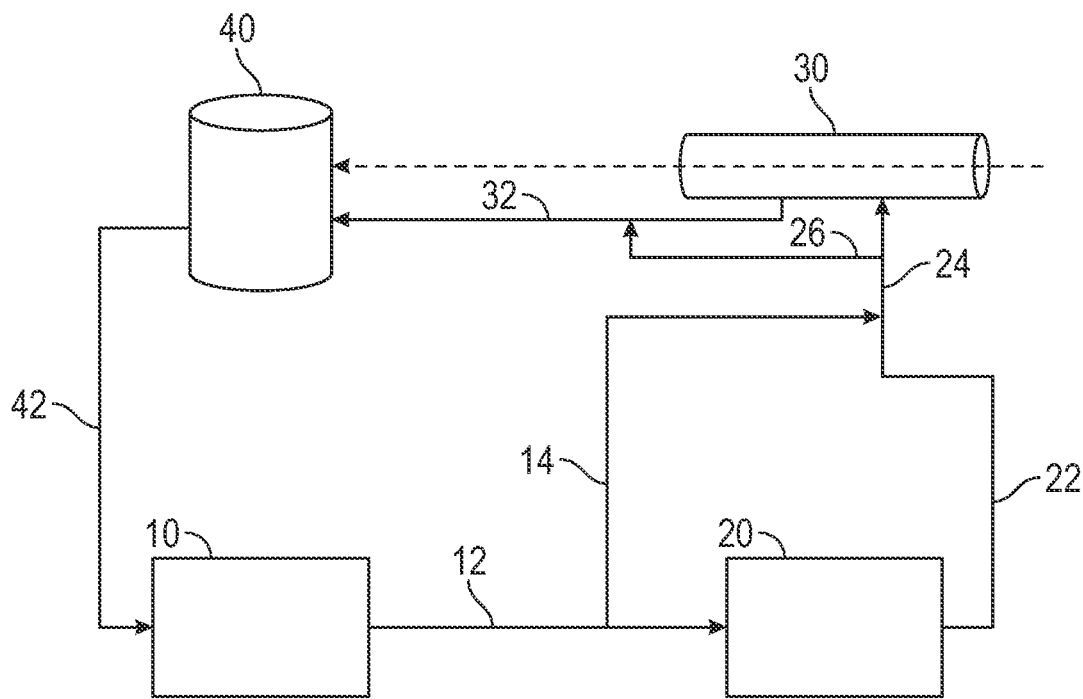
FIG. 5 is a simplified block flow diagram according to one or more embodiments disclosed.
Figure 6:
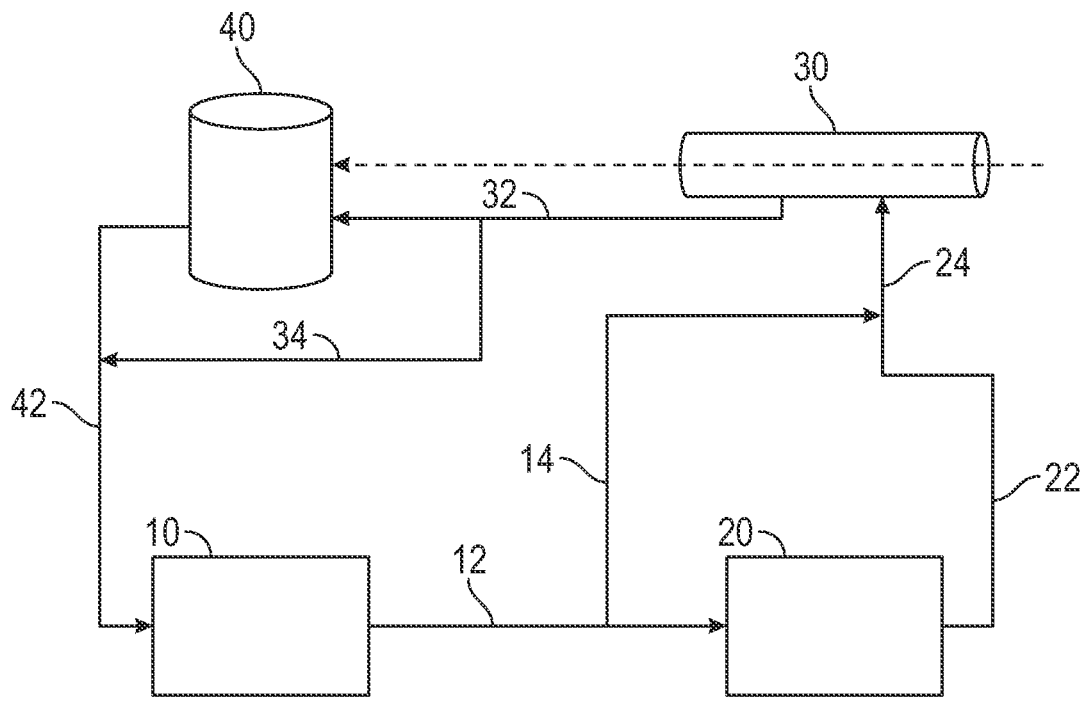
FIG. 6 is a simplified block flow diagram according to one or more embodiments disclosed.
Figure 7:
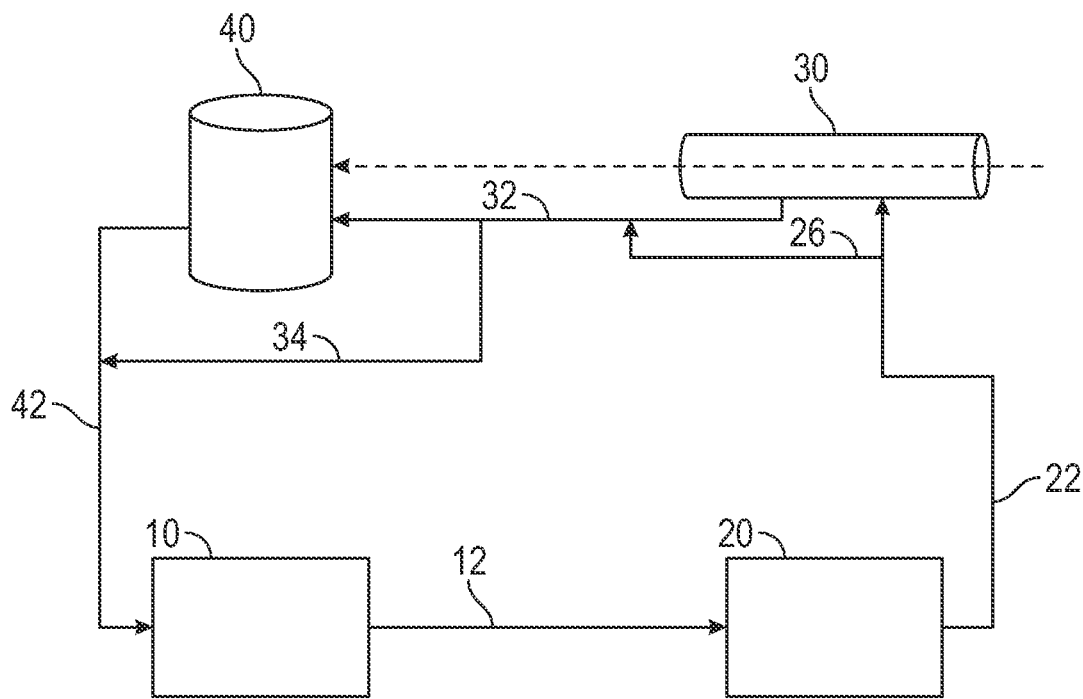
FIG. 7 is a simplified block flow diagram according to one or more embodiments disclosed.
Figure 8:
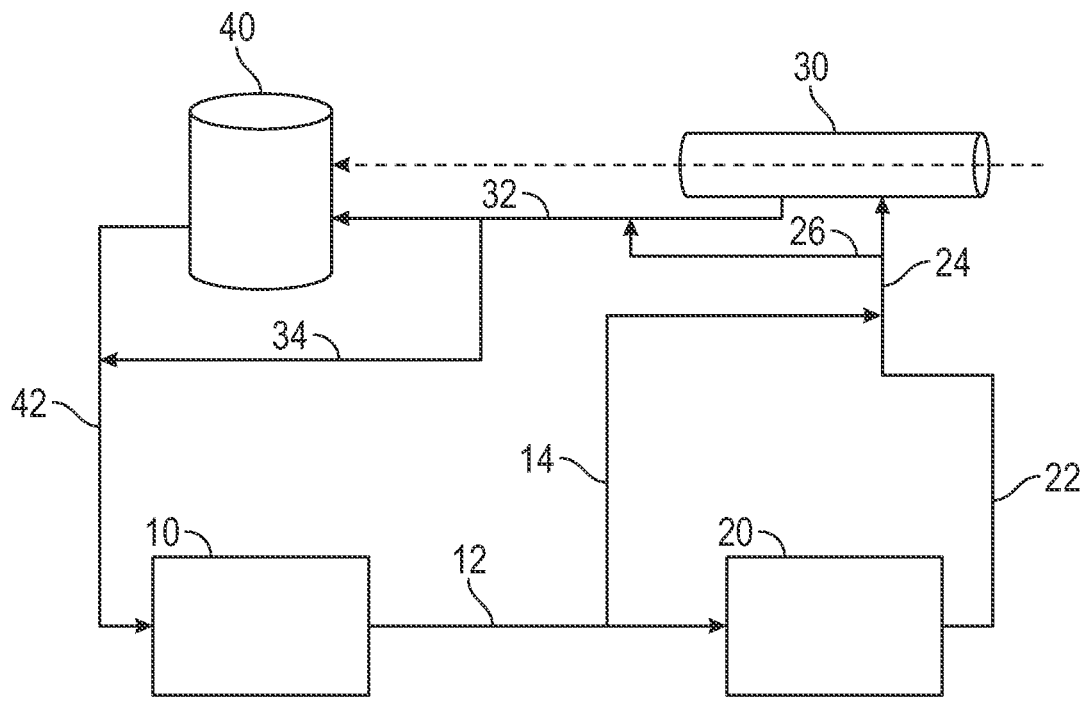
FIG. 8 is a simplified block flow diagram according to one or more embodiments disclosed.

The fourth transport line 14, first bypass line 26, and second bypass line 34 may be used in any combination depending on the heating requirements of the first sulfur transport and storage system and second sulfur transport and storage system. For example, in one or more embodiments, the fourth transport line 14 only may be used (FIG. 2), the first bypass line 26 only may be used (FIG. 3), or the second bypass line 34 only may be used (FIG. 4). In other embodiments, the fourth transport line 14 and first bypass line 26 may be used together (FIG. 5), the fourth transport line 14 and second bypass line 34 may be used together (FIG. 6), the first bypass line 26 and second bypass line 34 may be used together (FIG. 7), or the fourth transport line 14, the first bypass line 26, and the second bypass line 34 may be used together (FIG. 8). In some embodiments, the fourth transport line 14, first bypass line 26, and second bypass line 34 may each be equipped with a bypass valve (not illustrated). The bypass valves may allow for the dynamic alteration of the flow scheme depending on the heating requirements in the first and second sulfur transport and storage systems.

In one or more embodiments, by using the fourth transport line 14, the first bypass line 26, and the second bypass line 34 a portion of the hot oil circulating through the system may bypass each of the one or more reboilers 20, the heating jacket 30 on the first sulfur transport and storage system, and the second sulfur transport and storage system 40. This continuous bypass may maintain the temperature of the hot oil in the recirculation loop thereby reducing the amount of heat needed to be added in the hot oil distribution system 10.

The system described with respect to FIGS. 1-7 may be new construction or may be a retrofit to an existing sulfur transport and storage system. For retrofitting an existing system, a 4 to 6-inch branch line may be added downstream of the one or more reboilers 20. The 4-inch branch line may be the first transport line 22. The circulation pump associated with the AGH, TEG, AGE reboilers will circulate the hot oil from the AGH, TEG, or AGE system to the sulfur transport and handling system. The hot oil may be at a temperature in the range of 280-320° F., such as from 285-290° F., and a pressure in the range of 100 to 120 psig.

In addition, a makeup 2 to 3-inch branch line may be added to supply hot oil from upstream of the AGH, TEG, AGE reboilers 20 at a flow rate of about 15-100 GPM, such as from 15-60, and about 450-480° F. The makeup 2 to 3-inch branch line from the hot oil distribution system 10 may be joined with the 4 to 6-inch line of the first transport line 22 together as a new 6 to 8-inch line to feed hot oil the first sulfur transport and distribution system at a temperature from about 305-315° F. and a pressure in the range of 110-120 psig with total hot oil flow of about 200-500 GPM, such as from 350-400 GPM. A first portion of the hot oil stream having a flow rate from 100-350 GPM may be used to provide heat to the first sulfur transport and storage system instead of LP steam in order to maintain the temperature of sulfur product at 285-305° F. to avoid any solidification.

The remaining portion hot oil may bypass the first sulfur transport and storage system through an added 4-inch line (first bypass line 26) to join the hot oil exiting the heating jacket of the first sulfur transport and storage system at about 285-315° F. and 100-110 psig. Of the recombined hot oil stream in the second transport line 32, a first portion having a flow rate from about 200-500 GPM may be fed to the second sulfur transport and storage system 40 into two existing 3-inch coils in the bottom of the system (75-225 GPM of hot oil to each 3 inch coil). About 3-50 GPM of hot oil may be fed to an existing 1.5-inch coil in the top of the second sulfur transport and storage system 40. Such coils, whether fed with conventional steam or the hot oil according to one or more embodiments disclosed, may be used to maintain the sulfur temperature within 285-300° F. The outlet of coils and the hot oil in the second bypass line 34 may join into a new 6 to 8-inch hot oil line (the third transport line 42) at an outlet temperature of 285-295° F., which will be sent to the hot oil return header on the hot oil distribution system 10. The sulfur temperature within the second sulfur transport and storage system 40 may be maintained at about 285-300° F. This temperature may be sufficient to maintain the sulfur viscosity and avoid any solidification of sulfur product in the second sulfur transport and storage system 40.

Advantageously, by replacing a steam heating system with a hot oil recirculation system as described, the amount of steam required to be generated in a separate steam generation system may be eliminated. Further, hot oil in a closed loop as described may have little to no volume or mass losses overtime. The system may have low maintenance cost compared to a similarly used steam system as there will be no steam traps present in the hot oil circulation system which often require frequent maintenance. The hot oil recirculation system as described may also increase process reliability as the hot oil medium is less corrosive than the conventionally used steam, resulting in less downtime. Accordingly, the system may have greater uptime than a similar system using steam.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to +10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112 (f) for any limitations of any of the claims herein, except for those in which the claim expressly uses the words "means for" or "step for" together with an associated function.

What is claimed:

1. A system for heating one or more sulfur transport and storage systems, the system comprising:
   a hot oil distribution system configured for feeding a first hot oil stream to one or more reboilers;
   a first transport line fluidly connecting the one or more reboilers to an inlet on a heating jacket on a first sulfur transport and storage system, the first transport line configured to transport a second hot oil stream from the one or more reboilers to the inlet on the heating jacket on the first sulfur transport and storage system;

a second transport line fluidly connecting an outlet of the heating jacket on the first sulfur transport and storage system to an inlet on a heating coil in a second sulfur transport and storage system, the second transport line configured to transport a first cooled hot oil stream from the outlet of the heating jacket on the first sulfur transport and storage system to the inlet on the heating coil in the second sulfur transport and storage system;

a third transport line fluidly connecting an outlet on the heating coil in the second sulfur transport and storage system to a return header on the hot oil distribution system, the third transport line configured to transport a second cooled hot oil stream from the outlet of the heating coil in the second sulfur transport and storage system to a return header on the hot oil distribution system, and a fourth transport line fluidly connecting the hot oil distribution system to the first transport line at a point upstream of the inlet on the heating jacket on the first sulfur transport and storage system, the fourth transport line configured to feed a hot oil makeup stream from the hot oil distribution system to the first transport line bypassing the one or more reboilers and forming an intermediate hot oil stream.

2. The system of claim 1, wherein the first sulfur transport and storage system is a jacketed sulfur transport line.

3. The system of claim 1, where the second sulfur transport and storage system is a sulfur storage tank.

4. The system of claim 1, where the second hot oil stream in the first transport line is at a temperature from 285-290° F.

5. The system of claim 1, where the second cooled hot oil stream is lower in temperature than the first cooled hot oil stream.

6. The system of claim 1, where the hot oil makeup stream in the fourth transport line is at a temperature from 450-480° F. and the intermediate hot oil stream is at a temperature from 290-315° F.

7. The system of claim 1, further comprising a first bypass line fluidly connecting the first transport line upstream of the inlet on the heating jacket on the first sulfur transport and storage system to the second transport line downstream of the outlet on the heating jacket on the first sulfur transport and storage system.

8. The system of claim 1, further comprising a second bypass line fluidly connecting the second transport line upstream of the inlet on the heating coil in the second sulfur transport and storage system to the third transport line downstream of the outlet on the heating coil in the second sulfur transport and storage system.

9. A method for heating one or more sulfur transport and storage systems, the method comprising:

feeding a first portion of a first hot oil stream from a hot oil distribution system to one or more reboilers, recovering a second hot oil stream;

feeding a first portion of the second hot oil stream at a temperature from 285-295° F. from the one or more reboilers to through a first transport line to an inlet on a heating jacket on a first sulfur transport and storage system and heating a sulfur product in the first sulfur transport and storage system;

recovering a first cooled hot oil stream from an outlet on the heating jacket on the first sulfur transport and storage system;

feeding a first portion of the first cooled hot oil stream to an inlet on a heating coil in a second sulfur transport and storage system through a second transport line and heating a sulfur product in the second sulfur transport and storage system;

recovering a second cooled hot oil stream from an outlet on the heating coil in the second sulfur transport and storage system;

feeding the second cooled hot oil stream through a third transport line to a return header on the hot oil distribution system, and feeding a second portion of the first hot oil stream from the hot oil distribution system to the first transport line at a temperature from 450-480° F. to a point upstream of the inlet on the heating jacket on the first sulfur transport and storage system, and heating the second hot oil stream to a temperature from 290-315° F.

10. The method of claim 9, further comprising bypassing the heating jacket on the first sulfur transport and storage system with a second portion of the second hot oil stream using a first bypass line fluidly connecting the first transport line upstream of the inlet on the heating jacket on the first sulfur transport and storage system to the second transport line downstream of the outlet on the heating jacket on the first sulfur transport and storage system.

11. The method of claim 9, further comprising bypassing the heating coil in the second sulfur transport and storage system with a second portion of the first cooled hot oil stream using a second bypass line fluidly connecting the second transport line upstream of the inlet on the heating coil in the second sulfur transport and storage system to the third transport line downstream of the outlet on the heating coil in the second sulfur transport and storage system.

* * * * *